United States Patent [19]
Gerardot

[11] Patent Number: 5,983,962
[45] Date of Patent: Nov. 16, 1999

[54] MOTOR FUEL DISPENSER APPARATUS AND METHOD

[76] Inventor: Nolan P. Gerardot, 2727 Hoevelwood Dr., Fort Wayne, Ind. 46806

[21] Appl. No.: 08/880,567

[22] Filed: Jun. 23, 1997

Related U.S. Application Data

[60] Provisional application No. 60/020,350, Jun. 24, 1996.

[51] Int. Cl.⁶ .................................................. B67D 5/54
[52] U.S. Cl. ........................... 141/231; 141/67; 141/94; 141/98; 141/86; 141/382; 222/608; 222/626; 73/49.2; 220/571
[58] Field of Search .................................. 141/2, 67, 98, 141/94, 95, 86, 88, 382; 222/108, 608, 626, 627; 137/312, 313, 351, 899, 899.4; 220/571; 280/834, 836–839; 73/49.2, 49.3

[56] References Cited

U.S. PATENT DOCUMENTS

| | | | |
|---|---|---|---|
| Re. 18,063 | 5/1931 | Steinhauer | 222/627 |
| 1,737,929 | 12/1929 | Libby | 222/608 |
| 1,897,165 | 2/1933 | Endacott et al. | 222/627 |
| 2,315,085 | 3/1943 | Churchward | 222/3 |
| 2,498,229 | 2/1950 | Adler | 141/26 |
| 2,506,911 | 5/1950 | Zeigler | 222/627 |
| 2,784,747 | 3/1957 | Weempe | 141/231 |
| 2,894,659 | 7/1959 | Billeter et al. | 222/627 |
| 3,257,031 | 6/1966 | Dietz | 222/627 |
| 3,814,148 | 6/1974 | Wostl | 141/98 |
| 4,098,303 | 7/1978 | Gammell | 141/94 |
| 4,131,214 | 12/1978 | Rogers | 222/608 |
| 4,911,330 | 3/1990 | Vlaanderen et al. | 222/626 |
| 4,988,020 | 1/1991 | Webb | 222/608 |
| 5,365,980 | 11/1994 | DeBerardinis | 141/231 |
| 5,507,326 | 4/1996 | Cadman et al. | 141/95 |

*Primary Examiner*—J. Casimer Jacyna
*Attorney, Agent, or Firm*—Taylor & Associates, P.C.

[57] ABSTRACT

A portable fuel dispensing system which eliminates the need for underground storage tanks that are subject to leaks resulting in contamination of the stored fuel, soil and ground water creating costly environmental hazards. A semi-tractor trailer supported fuel receptacle has a plurality of metered fuel dispensers along the sides thereof allowing several customers to park along side the trailer and fuel their vehicles. The trailer may be taken to a central location for filling and then transported to a convenient retail location for dispensing the fuel to customers' vehicles. When empty, the trailer is returned to the central location for refuelling. During this return trip, the tank may be connected to a fuel/air inlet of the tractor so fuel vapor remaining in the tank may be burned rather than escaping into the atmosphere. The system is a completely closed system with no venting of fumes into the atmosphere.

3 Claims, 4 Drawing Sheets

MOTOR FUEL DISPENSER APPARATUS AND METHOD

CROSS-REFERENCE TO RELATED APPLICATIONS

This application claims the benefit of U.S. Provisional Application No. 60/020,350 filed Jun. 24, 1996.

SUMMARY OF THE INVENTION

The present invention relates generally to a system for the dispensing of liquid motor vehicle fuels such as diesel fuel, gasoline, or liquid propane at customer convenient locations without the need for underground tanks at those customer locations. It is the intent of this invention to provide an improved and revolutionary portable fuel dispensing system that would eliminate the need of underground storage tanks. such underground tanks are subject to leaks causing an environmental hazard by contamination of fuel, soil, and ground water which is sometimes used as drinking water. Research shows many areas have this problem. In Florida, for example, it is reported that 13,778 such leaking ground tanks have to be dug up because of potential contamination of the drinking water. A primary purpose of the present invention is to aid in a cleaner environment.

Above-ground fuel dispensing systems are known and illustrated, for example, by the U.S. patents to Brodie, U.S. Pat. No. 5,400,924 and Bryant, U.S. Pat. No. 5,114,046. These patented structures are not truly portable and are intended to remain at a specified location. The Rogers U.S. Pat. No. 4,131,214 patent shows a gasoline delivery truck which utilizes the air pressure associated with the vehicle air brakes to pressurize t a over the fuel for forcing fuel from the truck. This patented arrangement is for a delivery truck, not a retail dispensing device. The U.S. Pat. No. 4,988,020 to Webb shows a credit card actuable "portable" fuel dispensing device. Portability is claimed for this arrangement in that it may be redeployed at different locations on an airport. The structure is moved by a crane and employs conventional pumps for dispensing fuel. It would not be versatile nor economically feasible to transport a heavy concrete base and tank loaded with fuel over a long distance and heavily traveled highways. None of these devices is truly a portable fuel dispensing system.

Among the several objects of the present invention may be noted the provision of a fuel dispensing method and apparatus which overcomes the prior art defects; the provision of a fuel dispensing system which is versatile, economically feasible, profitable, and competitive in the market place. One of the many advantages of the present invention is the versatility in moving units out of areas when flooding occurs. These as well as other objects and advantageous features of the present invention will be in part apparent and in part pointed out hereinafter.

In general, a method of fuelling vehicles at selectable temporary locations includes initially filling the tank of a tractor movable trailer with fuel to be dispensed and then hauling the filled trailer to a selected site where it may be disconnecting leaving the trailer at the selected site for a period of time during which fuel is dispensed to a plurality of vehicles at the site. Fuel dispensing may be accomplished by pumping air into the trailer tank to supply fuel dispensing pressure to the tank, by hydraulically driven fuel pumps or by conventional fuel pumping techniques. When the fuel supply is exhausted, the trailer is again connected to a tractor and hauled to a site to be refilled with fuel. This step of reconnecting may include coupling the trailer tank interior to a fuel/air mixture inlet of the tractor to evacuate and burn remaining fuel vapor from the tank while hauling the trailer to the refuelling site.

Also in general, and in one form of the invention, an above ground portable fuel dispensing device includes a fuel container formed of inner and outer fuel impervious walls and a plurality of fuel metering and dispensing units coupled to the container for simultaneously dispensing metered quantities of fuel to a plurality of vehicles. A plurality of wheels such as the undercarriage of a semi-tractor trailer support the device for allowing the device to be moved between locations at which fuel is dispensed to vehicles and a fuel container refilling location. A plastic sight glass provides a means for detecting inner wall leaks by sensing for the presence of fuel in between the outer and inner walls. For dispensing highly flammable fuels, an air compressor may be used to pressurize an air space in the fuel container for forcing fuel from the container to the vehicles. As an alternative, each dispensing unit may including a hydraulically powered pump for pumping fuel from the container to a vehicles and a common source of pressurized hydraulic fluid may be coupled by oil line 20 to each of the fuel metering and dispensing units for selectively dispensing fuel from the units.

The system should not come under the present containment laws as it should not be considered as fuel in storage. For a large operation such as a high volume truck stop, the unloading time would be about the same as a fuel transport unit takes to unload into an underground storage tank. Such fuel transport trucks are typically not in containment while unloading fuel.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
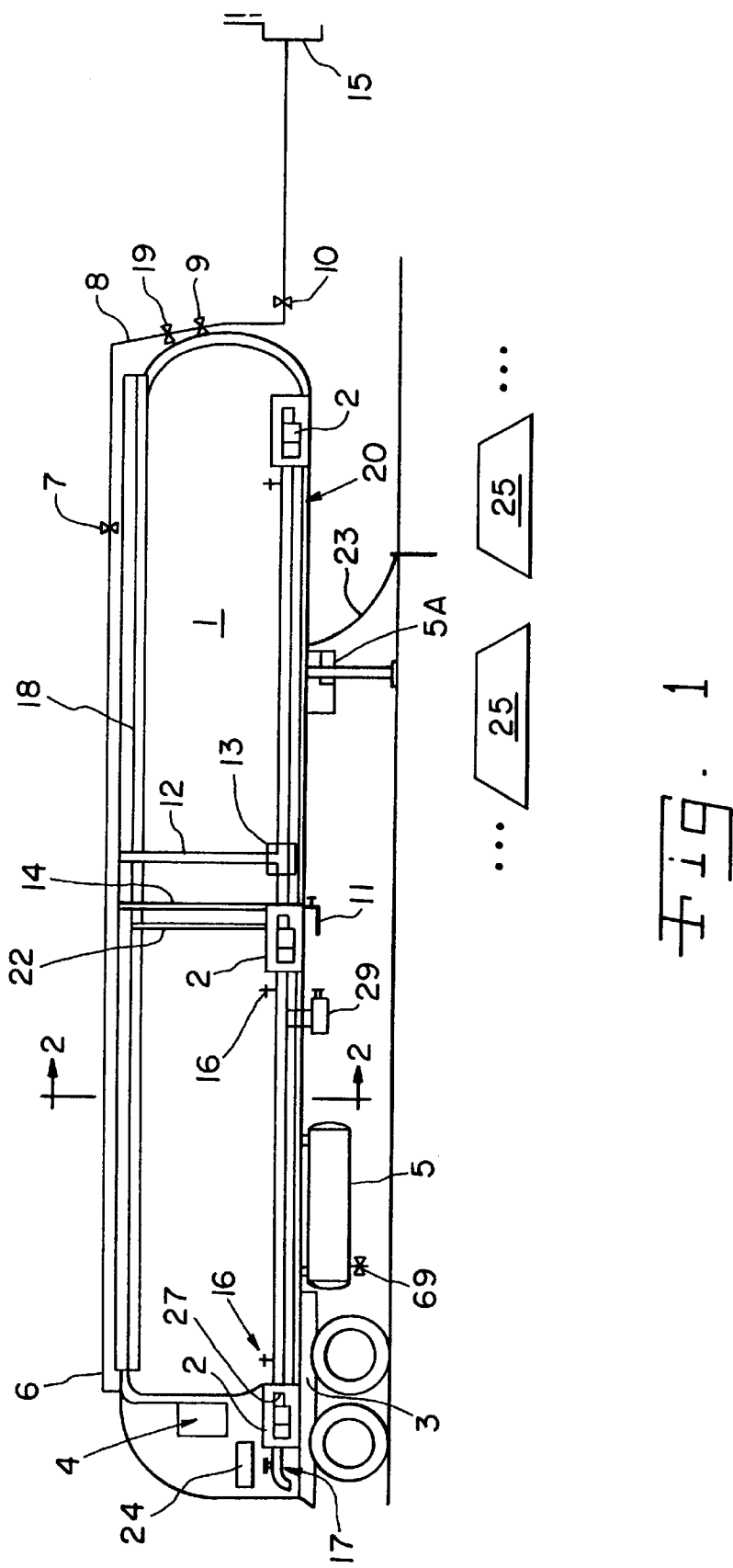
FIG. 1 is a side elevation view of a semi-tractor trailer incorporating the invention in one form.
Figure 2:
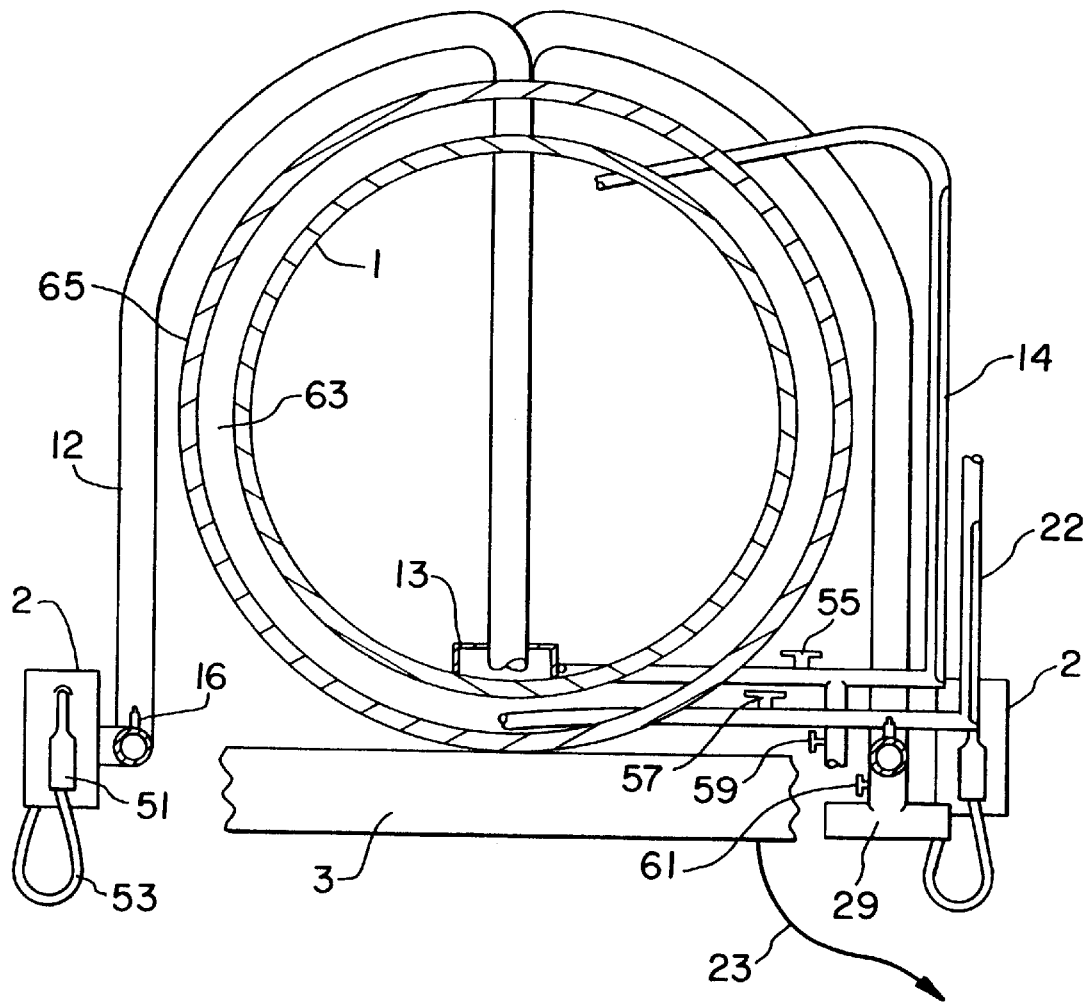
FIG. 2 is a view in cross-section along lines 2—2 of FIG. 1.
Figure 3:
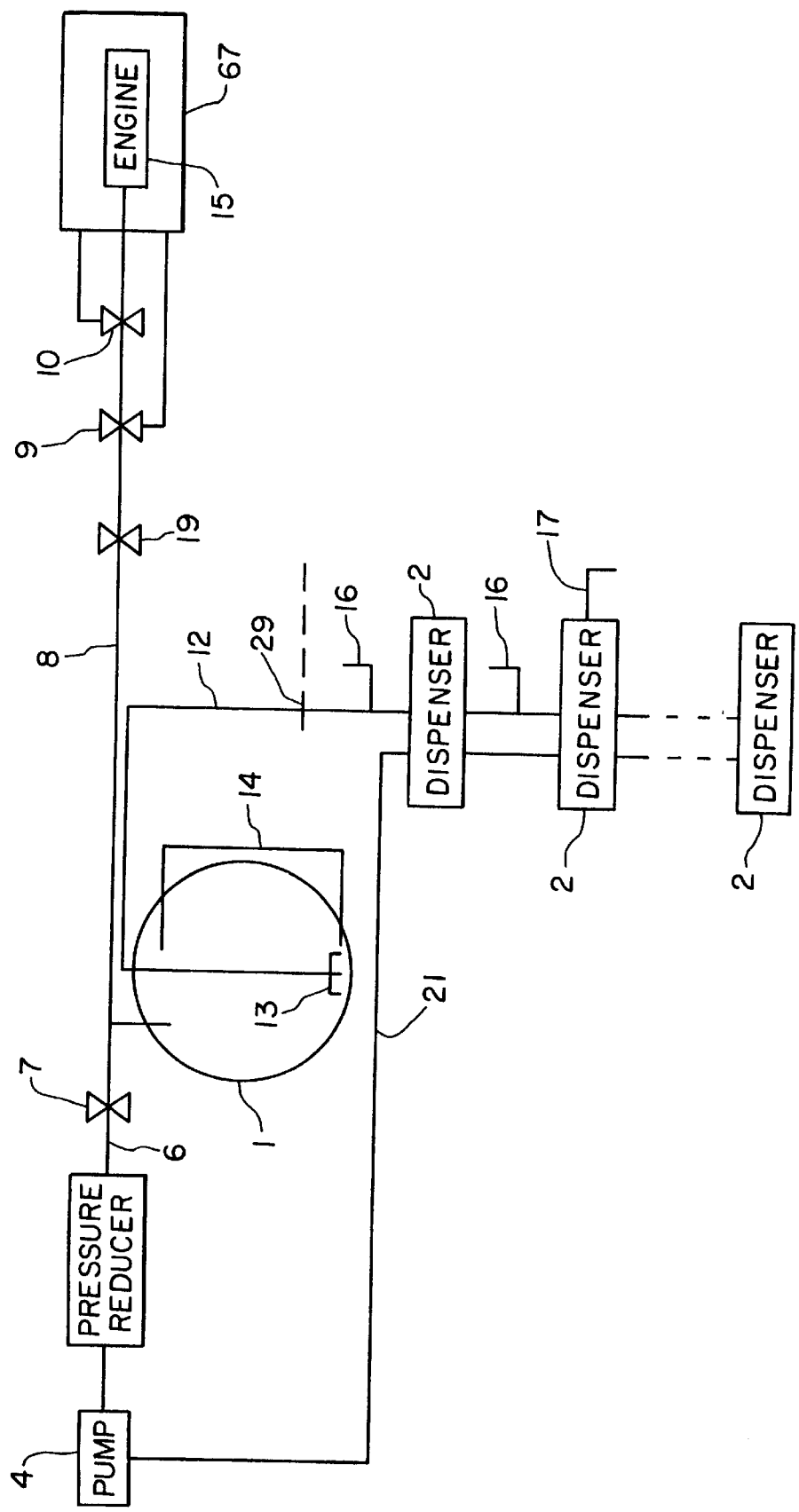
FIG. 3 is a schematic illustration of the fuel and fuel vapor flow paths in the system of FIGS. 1 and 2.

In general, fuel is loaded into receptacles or tanks 1 and then transported to dispensing stations or retail filling stations where fuel is dispensed and metered into customers' vehicles. If fuels with low flammability such as diesel or low octane gasolines are dispensed, regular single walled tanks or receptacles may be used along with conventional electrically driven pumps. However, if highly flammable fuels are being dispensed, then alternate systems and equipment may be used in order to meet all fire code and environmental laws. In such cases, fuel is loaded into tanks or receptacles 1 constructed with an inner wall 1 and outer wall 65 defining therebetween an air space 63. This air space 63 is monitored for the presence of fuel by connecting it to leak detector sight gauge 22 having a shut-off valve 57 which is closed during transport or when the leak detector is otherwise not needed to prevent chance of leaks. Fuels may be dispensed by air pressure within the supply tank supplied by pipe line 6 from air compressor 4 by way of a pressure reducer and an adjustable excess pressure relief valve 7. There may also be a high pressure air reserve tank 5. This air reserve tank provides high volume of air supply needed to operate all of the dispensers 2. The high pressure is reduced to a lower pressure by the pressure reducer of FIG. 3 and is limited by the adjustable control valves 7 and 19 to prevent excess pressure in the supply tank and the danger of explosion. An air pressure control valve and pressure gauge 9 may also be included. Fuels are thus forced by air pressure into the main manifold supply line 12 to supply all dispensers 2.

Fumes from the customer's filler line are taken back into the main supply tank by a ⅛ in. suction line 21 from the vacuum side of the air compressor 4 attached to the filler hose leading into the customer's tank. A small volume auxiliary air compressor 5A with a vacuum tank may be used in pumping customers' tires and also as a back-up in case of failure of the main compressor 4. Of course, the closed system vapor return from the individual dispensing units may be implemented independent of the compressor 4 if desired or in embodiments using a hydraulic or other pump system.

To prevent un-wanted air in the manifold, automatic air release valves 16 may be installed near each dispenser. A sight gauge 14 or other fuel level sensing system may be installed on the main supply tank. Such a level indicator is useful in preventing overfilling and allowing enough air space above the fuel in the tank. The sight gauge would also be used to determine when the supply tank requires refilling. The gauge is equipped with a shut-off cock 55 to prevent leaks which is opened only when the gauge is needed to determine the fuel level in the supply tank.

A separate sump with a drain valve 11 or drain valve 59 formed as part of the sight gauge assembly may be used to drain moisture or dirt from the main supply tank. A fuel filter 13 installed in the main line prevents dirt or contamination from entering into fuel dispensers and customers' vehicles. The main supply manifold 12 is equipped with a T connection 29 and its associated shut-off valve 61 which is used, if needed to supply additional dispensers for an expanded operating system. There is a main drain valve and lock 17 to be used to drain the main supply tank 1. Also, a drain cock 69 may be installed on the high pressure reserve air tank 5 to drain off water or moisture accumulating from the air compressor 4. A ground cable 23 may be attached to the main frame or chassis 3 of the trailer and connected to a ground rod driven into the earth of at least ten feet to prevent the buildup of static electricity and avoid any spark which could create a danger of fire. Concrete barriers 25 are set up on both sides of the carrier chassis to prevent accidental crashes into thee chassis and supply tank.

When the supply unit is empty, air in the supply tank should not be released into the atmosphere. In this completely closed system, this fuel vapor and air is transferred by way of pipe line 8 controlled by an adjustable relief valve with pressure gauge 9. Air would be released slowly into the breather of the truck 67 engine 15. Air from the tank would not be released into the engine until the engine reaches one half to full throttle. This is controlled by a solenoid on and off valve 10 controlled by the truck driver.

In addition to the inner wall 1 and reinforced outer wall 65 which provides containment in case of an inner wall leak, the dispensing units are all equipped with automatic shut-off filler nozzles 51 to prevent customers from overfilling their vehicle tanks. Hoses 53 are equipped with automatic disconnect snap couplers to prevent spillage if a customer fails to remove the nozzle prior to leaving the dispensing station. Concrete barriers 25 are placed around the supply unit to prevent collisions.

Figure 4:
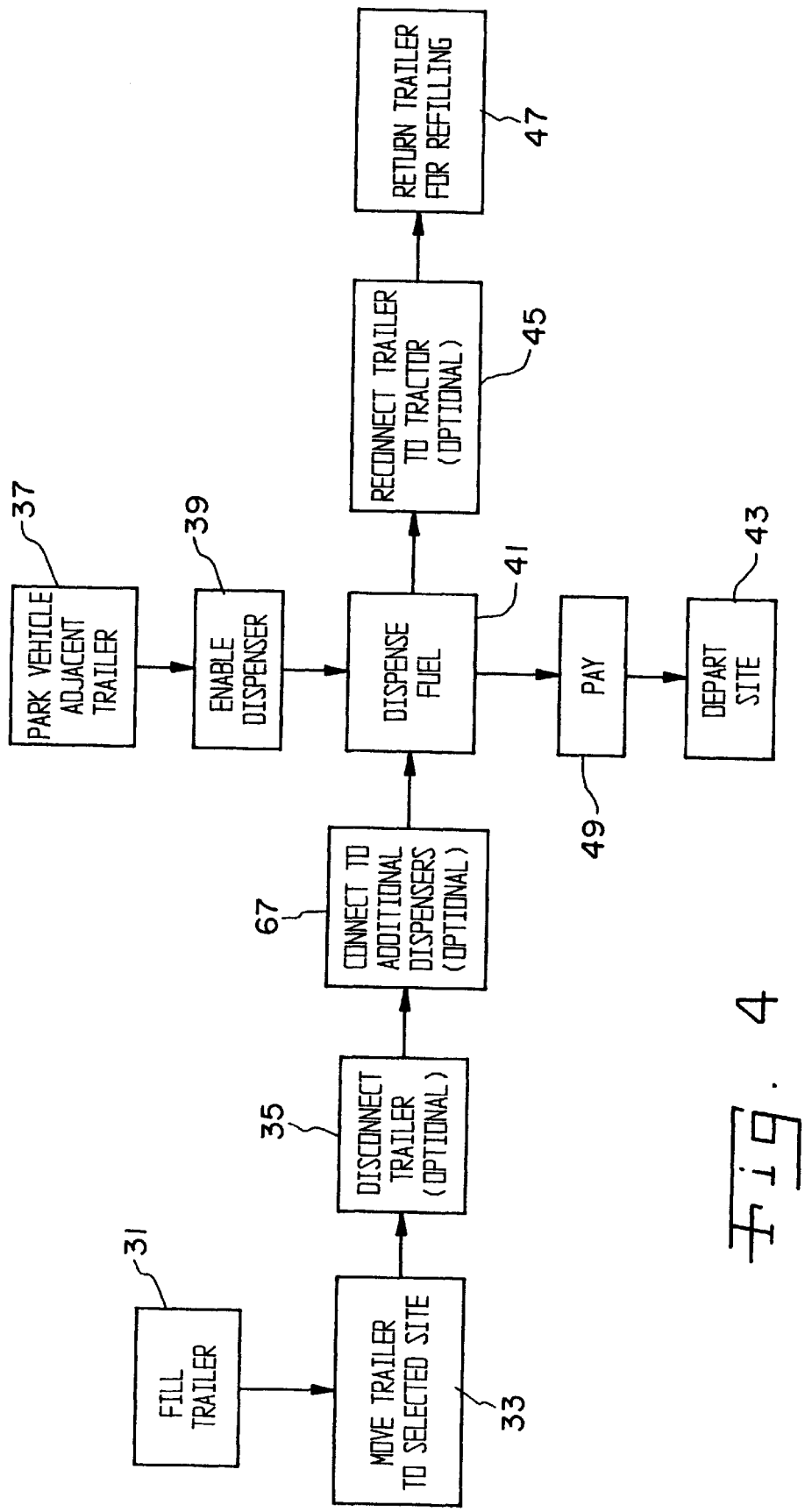
FIG. 4 is a schematic block diagram illustrating the sequence of events in supplying fuel to vehicles using a trailer dispensing system such as shown in FIG. 1.

The method of operation of the invention as depicted in FIG. 4 should now be clear. The preliminary steps include filling the trailer tank 31 and moving 33 the fuel laden trailer to a selected retail dispensing site. At the site, the trailer may be disconnected 35 from the tractor 67 and additional dispensing units located near to, but separate from the trailer connected to the T 29 if desired as indicated at 67. There would be no underground pipes to such additional dispensing units, but rather, the connections would be by aboveground pipes installed in steel reinforced gratings. The decision on whether to leave the tractor connected or to disconnect it and use it for transporting other trailers depends on scheduling and the level of fuel consumption at the site. Also, high volume of fuel consumption, or heavy use at certain times of the day at the site suggests the use of auxiliary dispensers in an expanded dispensing system.

The actual retail dispensing is powered by either the air compressor 4 or the hydraulic pump 24 and is indicted vertically in FIG. 4. A vehicle is parked 37 adjacent one of the dispensing units. The unit is enabled by credit, debit, or other card, or by conventional methods. Fuel dispensing into the vehicle tank is indicated at 41. Payment 49, if it is required, precedes vehicle departure 43. After numerous repetitions of the vertical dispensing process, the empty, or nearly empty unit is reconnected 45 to the tractor and returned 47 for refuelling. Reconnection includes connecting the line 8 to a fuel/air intake of the engine 15. During the return trip, the tractor driver may open the valve 10 to remove the vapors from the tank 1.

In summary, the invention has a number of advantages over known prior art. It offers cleaner fuels to retail customers. It eliminates the hazards of underground tanks. It lowers consumer cost because of more direct distribution and lower capital tied-up in fixed assets. There are less losses during transfers. There is ease of changing operation to a different location. As it is a completely closed system venting of fumes into the atmosphere is minimized.

From the foregoing, it is now apparent that a novel vehicle fuelling arrangement which eliminates the need for underground storage tanks has been disclosed meeting the objects and advantageous features set out hereinbefore as well as others, and that numerous modifications as to the precise shapes, configurations and details may be made by those having ordinary skill in the art. For example, while diesel fuel and gasoline are the most common vehicle fuels, liquid propane is a desirable fuel, particularly in highly populated areas where emissions from motor vehicles create environmental hazards. A trailer supported liquid propane tank with a liquid propane pump and liquid propane meters at the dispensing units may be employed in much the same way as has been described above. This and other modifications may be made without departing from the spirit of the invention or the scope thereof as set out by the claims which follow.

What is claimed is:

1. An above ground portable fuel dispensing device comprising:

a fuel container;

a plurality of fuel metering and dispensing units coupled to the container for simultaneously dispensing metered quantities of fuel to a plurality of vehicles;

an air compressor for providing a pressurized air space in the fuel container for forcing fuel from the container to the vehicles;

a plurality of wheels supporting the device comprising the undercarriage of a semi-tractor trailer for allowing the device to be moved between locations at which fuel is dispensed to vehicles and a fuel container refilling location and means coupling the fuel container interior to a fuel/air mixture inlet of the tractor to evacuate and burn remaining fuel vapor from the tank while hauling the trailer to said another site.

2. An above ground portable fuel dispensing device comprising:

a fuel container;

a plurality of fuel metering and dispensing units coupled to the container for simultaneously dispensing metered quantities of fuel to a plurality of vehicles, each unit including a hydraulically powered pump for pumping fuel from the container to the vehicles;

a source of pressurized hydraulic fluid;

means coupling the source of hydraulic fluid to each of the fuel metering and dispensing units for selectively dispensing fuel from the units;

a plurality of wheels supporting the device comprising the undercarriage of a semi-tractor trailer for allowing the device to be moved between locations at which fuel is dispensed to vehicles and a fuel container refilling location and means coupling the fuel container interior to a fuel/air mixture inlet of the tractor to evacuate and burn remaining fuel vapor from the tank while hauling the trailer to said another site.

3. The device of claim 2 including means for selectively coupling the fuel container to a plurality of additional fuel metering and dispensing units located near to, but separate from the device.

* * * * *